(12) United States Patent
Vora et al.

(10) Patent No.: US 11,409,736 B2
(45) Date of Patent: *Aug. 9, 2022

(54) METHODS AND APPARATUS FOR PERFORMING MACHINE LEARNING TO IMPROVE CAPABILITIES OF AN ARTIFICIAL INTELLIGENCE (AI) ENTITY USED FOR ONLINE COMMUNICATIONS

(71) Applicant: salesforce.com, inc., San Francisco, CA (US)

(72) Inventors: Darshil Vipul Vora, San Francisco, CA (US); Youngjun Kwak, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 16/595,113

(22) Filed: Oct. 7, 2019

(65) Prior Publication Data
US 2020/0042515 A1 Feb. 6, 2020

Related U.S. Application Data

(63) Continuation of application No. 15/471,838, filed on Mar. 28, 2017, now Pat. No. 10,474,673.

(51) Int. Cl.
*G06F 16/00* (2019.01)
*G06F 16/245* (2019.01)
(Continued)

(52) U.S. Cl.
CPC ............ *G06F 16/245* (2019.01); *G06F 16/22* (2019.01); *G06N 3/006* (2013.01); *G06N 5/041* (2013.01);
(Continued)

(58) Field of Classification Search
CPC .... G06F 16/245; G06F 16/22; G06F 16/3331; G06F 16/835; G06F 16/90335;
(Continued)

(56) References Cited

U.S. PATENT DOCUMENTS 5,577,188 A  11/1996  Zhu
5,608,872 A  3/1997  Schwartz et al.
(Continued)

*Primary Examiner* — Noosha Arjomandi
(74) *Attorney, Agent, or Firm* — LKGlobal | Lorenz & Kopf, LLP

(57) ABSTRACT

A method for providing query responses to a user via online chat establishes a first communication connection for online chat between a user interface and an artificial intelligence (AI) entity comprising a processor and a memory element configured to store a database of query answers; receives a user input query transmitted via the first communication connection; performs a lookup in the database of query answers, to locate a query answer corresponding to the user input query; when unable to locate a query answer, establishes a second communication connection for online chat between the user interface and a live agent interface that transmits responses dynamically provided by a human operator; evaluates a chat between the user interface and the live agent interface; identifies an answer to the user input query, based on evaluating the chat; and stores the answer to be provided by the AI entity in the future.

20 Claims, 4 Drawing Sheets

(51) Int. Cl.
  *H04L 51/02* (2022.01)
  *H04L 51/52* (2022.01)
  *G06N 3/00* (2006.01)
  *H04L 51/046* (2022.01)
  *G06F 16/22* (2019.01)
  *G06N 5/04* (2006.01)
  *G06N 20/00* (2019.01)

(52) U.S. Cl.
  CPC ............ *H04L 51/02* (2013.01); *H04L 51/046* (2013.01); *H04L 51/32* (2013.01); *G06N 20/00* (2019.01)

(58) Field of Classification Search
  CPC ........ G06N 5/041; G06N 3/006; G06N 20/00; H04L 51/02; H04L 51/32; H04L 51/046
  See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 * | 10/2004 | Jones ................. H04M 3/4938 455/563 |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,280,874 B2 * | 10/2012 | Weissman ........... G06F 21/6218 707/718 |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,719,281 B2 * | 5/2014 | LeBeau ................. G06F 16/953 707/748 |
| 9,336,526 B2 * | 5/2016 | Tuchman ............. H04M 3/5231 |
| 9,626,966 B2 * | 4/2017 | Berndt ....................... G10L 15/22 |
| 10,474,673 B2 * | 11/2019 | Vora ....................... G06F 16/22 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |

(56) References Cited

U.S. PATENT DOCUMENTS

| | | |
|---|---|---|
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2009/0245500 A1* | 10/2009 | Wampler ............... H04M 7/006 379/265.09 |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0119531 A1* | 5/2014 | Tuchman ............ H04L 12/1813 379/265.09 |
| 2014/0357961 A1* | 12/2014 | Meltzer ................. A61B 5/112 600/300 |
| 2015/0227941 A1* | 8/2015 | Tuchman ............ H04M 3/5183 705/7.14 |
| 2016/0037187 A1* | 2/2016 | Das .................... H04N 21/2668 725/62 |
| 2016/0132564 A1* | 5/2016 | Sabnani ............. G06F 16/2428 707/722 |
| 2016/0352656 A1* | 12/2016 | Galley ..................... H04L 51/02 |
| 2017/0017694 A1* | 1/2017 | Roytman ............... G06N 20/00 |
| 2017/0250936 A1* | 8/2017 | Rosenberg ............. H04L 51/18 |
| 2017/0310613 A1* | 10/2017 | Lalji ..................... H04L 63/083 |
| 2017/0324866 A1* | 11/2017 | Segre ...................... H04B 5/112 |
| 2018/0165554 A1* | 6/2018 | Zhang ..................... G06N 7/005 |
| 2018/0232741 A1* | 8/2018 | Jadhav .................... H04L 51/04 |
| 2018/0233057 A1* | 8/2018 | Sitton ...................... G09B 5/06 |
| 2018/0285413 A1* | 10/2018 | Vora ........................ G06F 16/22 |
| 2018/0287968 A1* | 10/2018 | Koukoumidis ....... G06F 40/289 |
| 2020/0042515 A1* | 2/2020 | Vora ........................ H04L 51/32 |

* cited by examiner

METHODS AND APPARATUS FOR PERFORMING MACHINE LEARNING TO IMPROVE CAPABILITIES OF AN ARTIFICIAL INTELLIGENCE (AI) ENTITY USED FOR ONLINE COMMUNICATIONS

CROSS-REFERENCE TO RELATED APPLICATION(S)

This application is a continuation of U.S. patent application Ser. No. 15/471,838, filed Mar. 28, 2017, the entire contents of which are incorporated by reference herein.

TECHNICAL FIELD

Embodiments of the subject matter described herein relate generally to the use of artificial intelligence associated with online communications. More particularly, embodiments of the subject matter relate to providing a communication channel for live communication, by a chat-bot, under defined conditions.

BACKGROUND

Artificial intelligence (AI) may be used to provide information to users via online communications with "chat-bots" or other automated interactive tools. Using chat-bots, automated AI systems conduct text-based chat conversations with users, through which users request information. Chat-bots generally provide information to users for predetermined situations, such as a recognized input user question for which a known answer may be provided. However, a chat-bot may not have access to a predefined or known answer for certain input user questions. In this case, the text-based, online conversation with the chat-bot may fail or generate an error condition, which may result in user frustration due to the inability of the chat-bot to address the concerns of the user.

Accordingly, it is desirable to provide additional information to a user when AI embodiments are unable to do so. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for providing query responses to a user via online chat. The method establishes a first communication connection for online chat between a user interface and an artificial intelligence (AI) entity comprising at least one processor and a memory element configured to store a database of query answers; receives, by the at least one processor, a user input query transmitted via the first communication connection and from the user interface; performs a lookup, by the at least one processor, in the database of query answers, to locate a query answer corresponding to the user input query; when the at least one processor is unable to locate a query answer corresponding to the user input query, establishes a second communication connection for online chat between the user interface and a live agent interface, wherein the live agent interface transmits responses that are dynamically provided by a human operator; evaluates a chat between the user interface and the live agent interface, the chat transmitted via the second communication connection; identifies an answer to the user input query, based on evaluating the chat; and stores the answer to be provided by the AI entity during future chat instances of receiving the user input query.

Some embodiments of the present disclosure provide a system for providing query responses to a user via online chat, the system comprising an artificial intelligence (AI) entity. The system includes a system memory element configured to store a database of query answers; a communication device, configured to establish communication connections using a computer network; and at least one processor communicatively coupled to the system memory element and the communication device, the at least one processor configured to: establish a first communication connection, via the communication device, for online chat between a user interface and the AI entity; receive a user input query transmitted via the first communication connection and from the user interface; perform a lookup in the database of query answers, to locate a query answer corresponding to the user input query; when the database does not include a query answer corresponding to the user input query, establish a second communication connection for online chat between the user interface and a live agent interface, wherein the live agent interface transmits responses that are dynamically provided by a human operator; evaluate a chat between the user interface and the live agent interface, the chat transmitted via the second communication connection; identify an answer to the user input query, based on evaluating the chat; and store the answer to be provided by the AI entity during future chat instances of receiving the user input query.

Some embodiments of the present disclosure provide a non-transitory, computer-readable medium containing instructions thereon, which, when executed by a processor, are capable of performing a method. When the processor is unable to locate a query answer corresponding to a user input query submitted to an artificial intelligence (AI) entity via a user interface of an instant messaging platform, the method establishes a second communication connection for online chat between the user interface and a live agent interface, wherein the live agent interface transmits responses that are dynamically provided by a human operator; evaluates a chat between the user interface and the live agent interface, the chat transmitted via the second communication connection; identifies an answer to the user input query, based on evaluating the chat; and stores the answer to be provided by the AI entity during future chat instances of receiving the user input query.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to apparatus and methods for using artificial intelligence (AI) entities, also known as "chat-bots", to provide information to an end user. More specifically, the subject matter relates to the use of chat-bots to provide automated responses to various end user queries, to connect the end user to a live agent when a query response is not available, and performing "machine learning" to acquire additional query responses through evaluation of online chat between the end user and a live agent.

Figure 1:
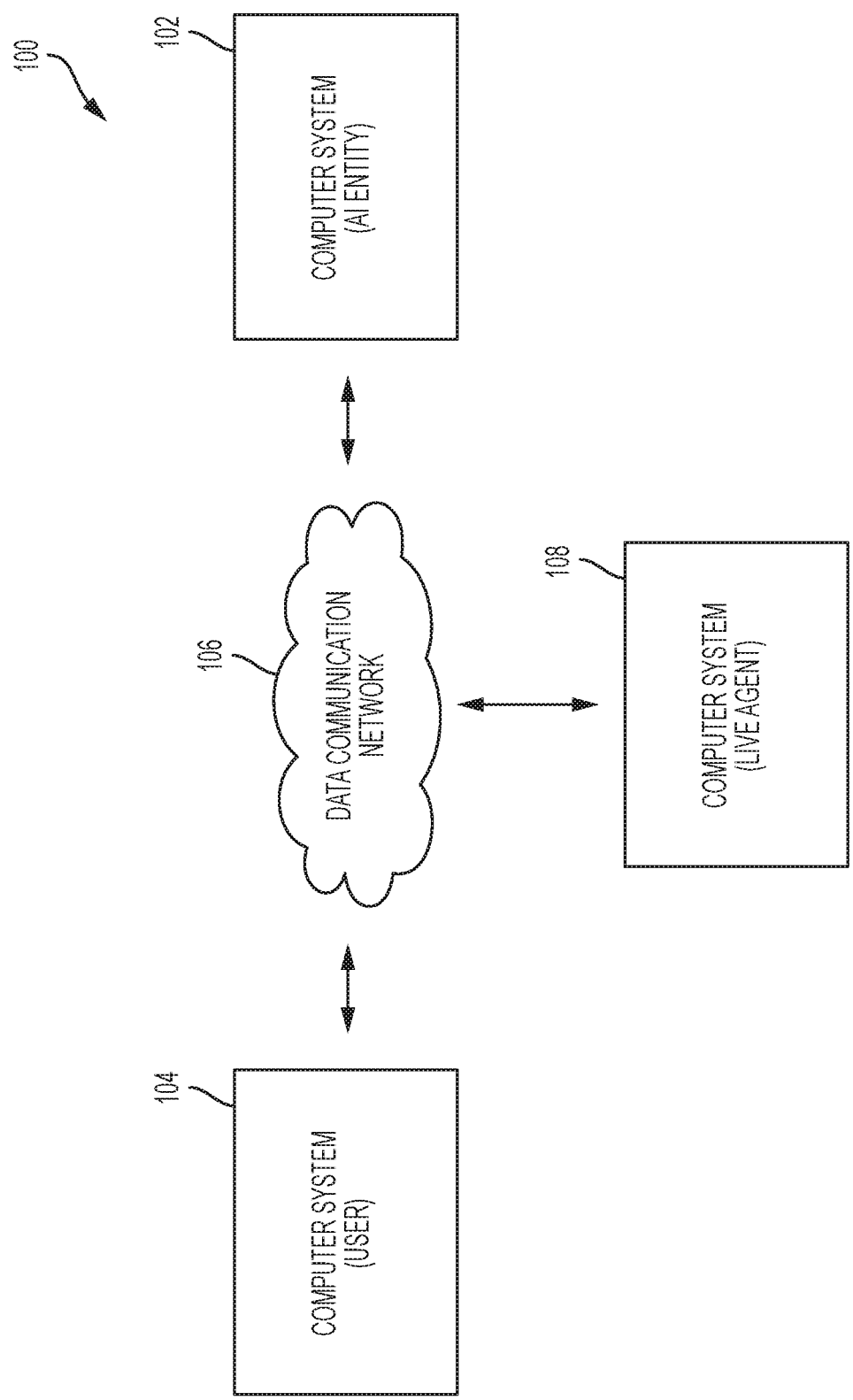
FIG. 1 is a diagram of an online communication system used in machine learning, in accordance with the disclosed embodiments.

Turning now to the figures, FIG. 1 is a diagram of an online communication system 100 used in machine learning, in accordance with the disclosed embodiments. As shown, the online communication system 100 includes an AI entity computer system 102 with the capability to communicate, via a data communication network 106, with a user computer system 104 and a human operator at a live agent computer system 108. It should be appreciated that the AI entity computer system 102, the user computer system 104, and the live agent computer system 108, and any corresponding logical elements, individually or in combination, are exemplary means for performing a claimed function. In practice, an embodiment of the online communication system 100 may include additional or alternative elements and components, as desired for the particular application, without departing from the scope of the present disclosure.

Figure 2:
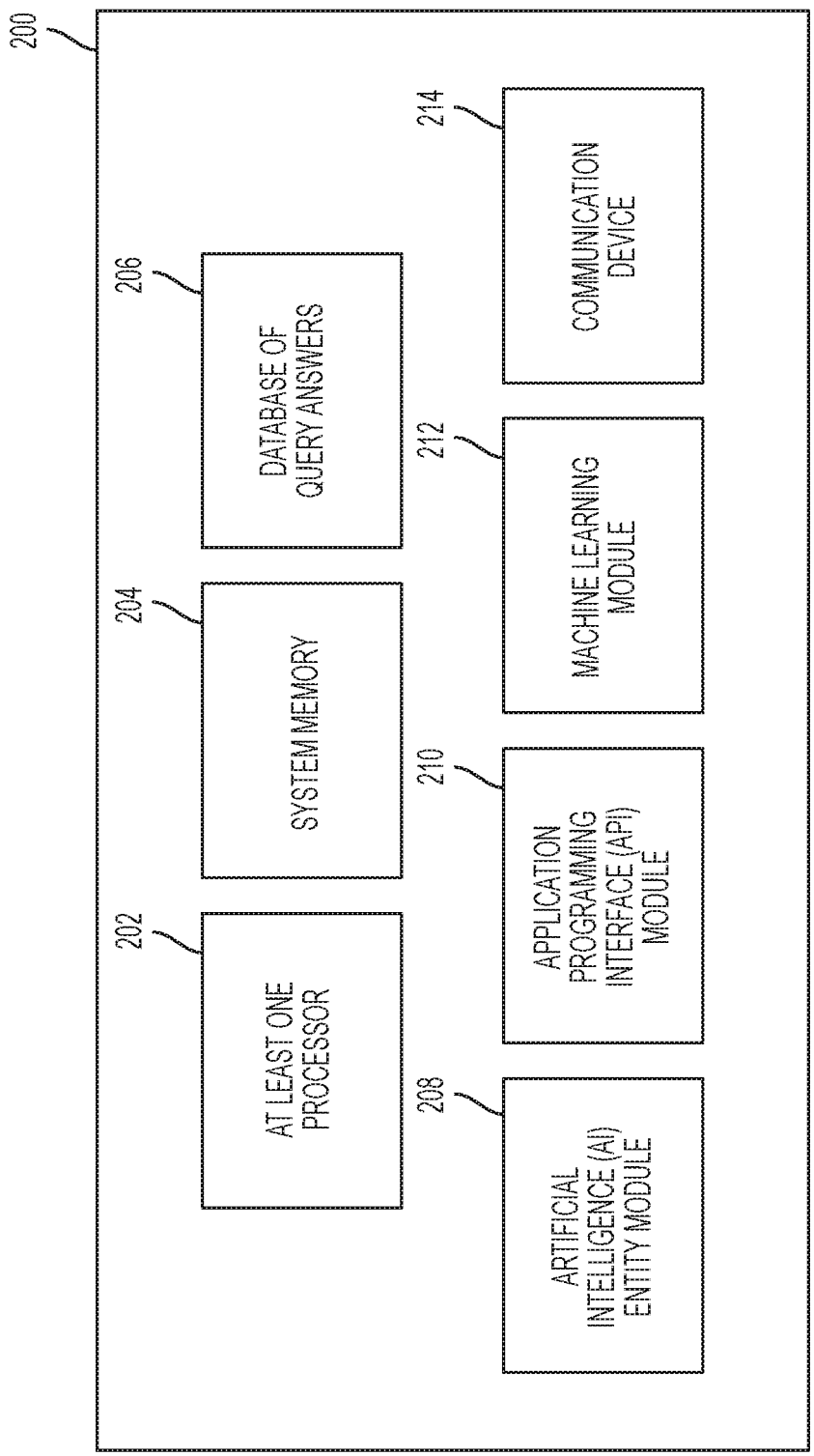
FIG. 2 is a functional block diagram of an artificial intelligence (AI) entity computer system, in accordance with the disclosed embodiments.

The AI entity computer system 102 may be implemented using any suitable computer that includes at least one processor, some form of memory hardware, and communication hardware, as described herein with respect to FIG. 2. In some embodiments, the AI entity computer system 102 includes one or more dedicated computers. The server system is generally configured to store, maintain, and execute one or more software platforms and programs, such as artificial intelligence and machine learning programs, online chat applications, and one or more databases that include predefined query responses for online interaction with a user.

The user computer system 104 may be implemented by any computing device that includes at least one processor, some form of memory hardware, a user interface, and communication hardware, such that a user may communicate with the AI entity computer system 102 and/or the live agent computer system 108. The user computer system 104 is capable of communicating with the AI entity computer system 102 and the live agent computer system 108 via a data communication network 106. The user computer system 104 and the AI entity computer system 102 are generally disparately located. The user computer system 104 is configured to transmit text-based, voice-based, and/or video-based communications to an artificial intelligence (AI) entity stored and executed by the AI entity computer system 102, which provides predefined answers in response.

The live agent computer system 108, like the user computer system 104, may be implemented by any computing device that includes at least one processor, some form of memory hardware, and a user interface, such that a human operator may communicate with the user computer system 104 by sending and receiving text-based, voice-based (i.e., audio), and/or video-based messages from the live agent computer system 108. The user computer system 104 and the live agent computer system 108 are generally disparately located, and the exchange of text-based, voice-based, and/or video-based messages generally occurs over the data communication network 108.

The AI entity computer system 102, the user computer system 104, and the live agent computer system 108 are capable of communicating via a data communication network 106. The data communication network 106 may be any digital or other communications network capable of transmitting messages or data between devices, systems, or components. In certain embodiments, the data communication network 106 includes a packet switched network that facilitates packet-based data communication, addressing, and data routing. The packet switched network could be, for example, a wide area network, the Internet, or the like. In various embodiments, the data communication network 106 includes any number of public or private data connections, links or network connections supporting any number of communications protocols. The data communication network 106 may include the Internet, for example, or any other network based upon TCP/IP or other conventional protocols. In various embodiments, the data communication network 106 could also incorporate a wireless and/or wired telephone network, such as a cellular communications network for communicating with mobile phones, personal digital assistants, and/or the like. The data communication network 106 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein.

During typical operation, the user computer system 102 may request connection to an AI entity stored, maintained, and executed by the AI entity computer system 102. In response, the AI entity computer system 102 establishes a communication connection, via the data communication network 108, to the user computer system 104. A user may conduct (via the user computer system 104) a text-based, voice-based, and/or video-based chat session with the AI entity (via the AI entity computer system 102) which may be implemented as a "chat-bot". Through this text-based, voice-based, and/or video-based chat session, the user computer system 104 transmits queries to the AI entity, and in response, the AI entity computer system 102 provides predefined query responses that are stored by the AI entity computer system 102. When the user computer system 104 transmits a user query for which no predefined query response exists (i.e., the AI entity computer system 102 does not recognize an answer to a received query), then the AI entity computer system 102 connects the user computer system 104 to the live agent computer system 108, such that a human operator of the live agent computer system 108 may provide an appropriate response to the transmitted query. In this scenario, the AI entity computer system 102 monitors that chat session that occurs between the user computer system 104 and the live agent computer system 108, identifies an answer to the previously unrecognized user query, and stores the answer for future query response purposes.

FIG. 2 is a functional block diagram of an artificial intelligence (AI) entity computer system 200, in accordance with the disclosed embodiments. It should be noted that the AI entity computer system 200 can be implemented with the AI entity computer 102 depicted in FIG. 1. In this regard, the AI entity computer system 200 shows certain elements and components of the AI entity computer system 102 in more detail. The AI entity computer system 200 generally includes, stores, maintains, operates, and/or executes, without limitation: at least one processor 202; system memory 204 hardware; a database of query answers 206; an artificial intelligence (AI) module 208; an application programming interface (API) module 210; a machine learning module 212; and a communication device 214. These elements and features of the AI entity computer system 200 may be operatively associated with one another, coupled to one another, or otherwise configured to cooperate with one another as needed to support the desired functionality, as described herein. For ease of illustration and clarity, the various physical, electrical, and logical couplings and interconnections for these elements and features are not depicted in FIG. 2. Moreover, it should be appreciated that embodiments of the AI entity computer system 200 will include other elements, modules, and features that cooperate to support the desired functionality. For simplicity, FIG. 2 only depicts certain elements that relate to the techniques described in more detail below.

The at least one processor 202 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 202 may be realized as one or more microprocessors, controllers, microcontrollers, or state machines. Moreover, the at least one processor 202 may be implemented as a combination of computing devices, e.g., a combination of digital signal processors and microprocessors, a plurality of microprocessors, one or more microprocessors in conjunction with a digital signal processor core, or any other such configuration.

The at least one processor 202 is communicatively coupled to, and communicates with, the system memory 204. The system memory 204 is configured to store any obtained or generated data associated with storing, maintaining, and executing an AI entity used to conduct text-based, voice-based, and/or video-based online conversations (e.g., "chat") with a user. The system memory 204 may be realized using any number of devices, components, or modules, as appropriate to the embodiment. Moreover, the AI entity computer system 200 could include system memory 204 integrated therein and/or a system memory 204 operatively coupled thereto, as appropriate to the particular embodiment. In practice, the system memory 204 could be realized as RAM memory, flash memory, EPROM memory, EEPROM memory, registers, a hard disk, a removable disk, or any other form of storage medium known in the art. In certain embodiments, the system memory 204 includes a hard disk, which may also be used to support functions of the server system 200. The system memory 204 can be coupled to the at least one processor 202 such that the at least one processor 202 can read information from, and write information to, the system memory 204. In the alternative, the system memory 204 may be integral to the at least one processor 202. As an example, the at least one processor 202 and the system memory 204 may reside in a suitably designed application-specific integrated circuit (ASIC).

The database of query answers 206 includes a plurality of stored, predefined responses for user queries received by the AI entity computer system 200. Each of the plurality of predefined responses is associated with one or more defined user queries, and may be provided in response to receiving a corresponding user query. The database of query answers 206 is generally stored in the system memory 204 element, and is accessed and searched by the AI entity module 208 in response to user queries.

The artificial intelligence (AI) entity module 208 is suitably configured to implement and use one or more AI entities, or in other words, "chat-bots", to interact with a user (e.g., a user computer system, as described in FIG. 1) via a text-based, voice-based, and/or video-based chat feature of any appropriate communication platform. As used herein, chat-bot may be defined as a computer program that simulates human conversation (i.e., "chat") through artificial intelligence. Typically, a chat-bot will communicate with a human user, and chat-bots are often used in online applications that provide online help or customer service. The AI entity module 208 implements one or more chat-bots to interact with any communication platform or chat product or service, such as Facebook Messenger, Twitter, Slack, Telegram, Alexa, Skype, or any other text messaging platform. In certain embodiments, the AI entity module 2085 provides a chat-bot to interact with a user via a user interface of a communication platform executed and operated by the user. Such a chat-bot may provide text-based, voice-based, or video-based answers to user-entered queries. The AI entity module 208 includes intelligence to interpret intent of a user and to make appropriate decisions based on past interactions with users. In the event of uncertainty (e.g., a user query with no predefined answer), the AI entity module 208 redirects the request to a live agent.

The application programming interface (API) module 210 is configured to store, maintain, and execute one or more APIs to facilitate communication between the AI entity computer system 200 and an end user, and between an end user and a human operator. For communications between the AI entity computer system 200 and an end user, the API module 210 may use text APIs, audio call APIs, video call APIs, and live agent text chat APIs. For communications between an end user and a human operator, the API module 210 functions to establish a communication connection between a user computer system and a live agent computer system, wherein the user computer system, the live agent computer system, and the AI entity computer system 200 are separate and distinct computers that communicate via a data communication network, as described with respect to FIG. 1.

The machine learning module 212 is configured to identify previously unknown responses applicable to received user queries, and to associate and store the previously unknown responses with the corresponding user queries, for future use. Exemplary embodiments of the machine learning module 212 monitor online chat sessions between a user computer system and a live agent computer system, that have been established by the AI entity module 208, using the API module 210. Such chat sessions are established when the AI entity module 208 is unable to provide an answer to a user query, and the answer must be requested from a live agent. The machine learning module 212 evaluates the chat session to identify the answer, associates the answer to the submitted user query, and stores the user query and identified answer in the database of query answers 206, for future use when providing a query response to another instance of receiving the user query.

In practice, the artificial intelligence (AI) entity module 208, the application programming interface (API) module 210, and/or the machine learning module 212, may be implemented with (or cooperate with) the at least one processor 202 to perform at least some of the functions and operations described in more detail herein. In this regard the artificial intelligence (AI) entity module 208, the application programming interface (API) module 210, and/or the machine learning module 212 may be realized as suitably written processing logic, application program code, or the like.

The communication device 214 is suitably configured to communicate data between the AI entity computer system 200 and one or more user computer systems (e.g., user computer system 104 of FIG. 1) and one or more live agent computer systems (e.g., live agent computer system 108 of FIG. 1). The communication device 214 may transmit and receive communications over a wireless local area network (WLAN), the Internet, a satellite uplink/downlink, a cellular network, a broadband network, a wide area network, or the like. As described in more detail below, data received by the communication device 214 may include, without limitation: text-based, voice-based, and/or video-based messages from a user via a chat-bot (i.e., AI entity) and/or a live agent computer system, and other data compatible with the AI entity computer system 200. Data provided by the communication device 214 may include, without limitation, user query responses, and the like.

Figure 3:
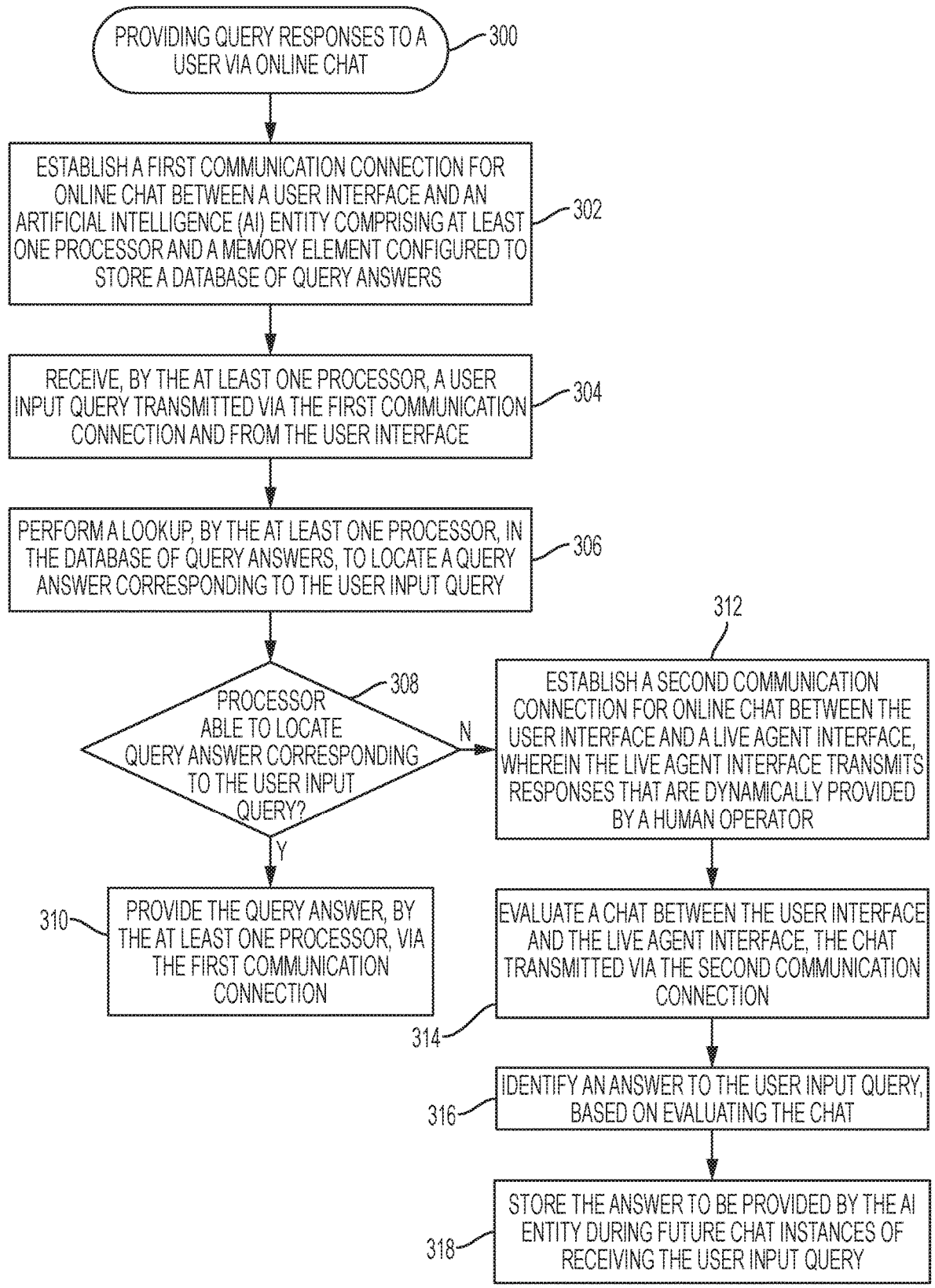
FIG. 3 is a flow chart that illustrates an embodiment of a process for providing query responses to a user via online chat, by an AI entity.

FIG. 3 is a flow chart that illustrates an embodiment of a process 300 for providing query responses to a user via online chat, by an AI entity. The various tasks performed in connection with process 300 may be performed by software, hardware, firmware, or any combination thereof. For illustrative purposes, the following description of process 300 may refer to elements mentioned above in connection with FIGS. 1-2. In practice, portions of process 300 may be performed by different elements of the described system. It should be appreciated that process 300 may include any number of additional or alternative tasks, the tasks shown in FIG. 3 need not be performed in the illustrated order, and process 300 may be incorporated into a more comprehensive procedure or process having additional functionality not described in detail herein. Moreover, one or more of the tasks shown in FIG. 3 could be omitted from an embodiment of the process 300 as long as the intended overall functionality remains intact.

First, the process 300 establishes a first communication connection for online chat between a user interface and an artificial intelligence (AI) entity comprising at least one processor and a memory element configured to store a database of query answers (step 302). The first communication connection provides a mechanism by which a user computer system communicates with an AI entity, or "chat-bot", provided by an AI entity computer system, as described with respect to FIG. 1. The process 300 then receives, by the at least one processor, a user input query transmitted via the first communication connection and from the user interface (step 304). In some embodiments, the first communication connection is established when the AI entity connects to an instant messaging platform using a computer network, wherein the user interface comprises a graphical user interface (GUI) presented by the instant messaging platform, and wherein the user input query is received by the AI entity via the GUI and transmitted by the instant messaging platform. In some embodiments, the first communication connection is established when the AI entity connects to a social media instant messaging platform using a computer network, wherein the user interface comprises a social media chat interface presented by the social media instant messaging platform, and wherein the user input query is received via the social media chat interface and transmitted by the social media instant messaging platform.

Once the user query is received by the AI entity (step 306), the process 300 performs a lookup, by the at least one processor, in the database of query answers, to locate a query answer corresponding to the user input query (step 306), and the process 300 then determines whether the processor is able to locate a query answer corresponding to the user input query (decision 308). In some embodiments, locating a query answer, by the at least one processor, includes performing the lookup to locate a match for the user input query in the database, wherein the query answer corresponding to the user input query further corresponds to the match in the database, and when there is no match for the user input query in the database, determining that the at least one processor is unable to locate a query answer. Here, the process 300 seeks an exact match to the user input query, and determines whether an appropriate response to the user input query is available by comparing the user input query to the contents of the database of query answers. The database of query answers includes a plurality of predefined query answers and corresponding user input queries, and the process 300 identifies the appropriate response by comparing the user input query to the contents of the database of query answers and locating a match among the stored, corresponding user input queries.

In other embodiments, the database comprises a plurality of candidate user input queries, and locating a query answer, by the at least one processor, includes performing the lookup to locate at least one of the plurality of candidate user input queries within a confidence threshold, and when the plurality of candidate user input queries are not within the confidence threshold, determining that the at least one processor is unable to locate a query answer. Here, the process 300 Natural Language Processing and machine learning to determine, within certain confidence level, the intent and sentiment of the user. Then the Confidence threshold, which is pre-set by an administrator, is used by the process 300 to evaluate whether the machine-determined understanding of the user query is accurate enough. If one of the plurality of candidate user input queries in within the predefined confidence threshold, then the process 300 handles the user request, as described herein with regard to step 310. If not, the user query is forwarded to a human agent, as described herein with regard to steps 312-318.

When the processor is able to locate a query answer corresponding to the user input query (the "Yes" branch of 308), then the process 300 provides the query answer, by the at least one processor, via the first communication connection (step 310). Here, the query answer has been located in the database of query answers and is transmitted, via the first communication connection, to the user interface for presentation to the user.

However, when the processor is unable to locate a query answer corresponding to the user input query (the "No" branch of 308), then the process 300 establishes a second communication connection for online chat between the user interface and a live agent interface, wherein the live agent interface transmits responses that are dynamically provided by a human operator (step 312). Here, because the process 300 is unable to provide a recognized appropriate response to the user input query, the process 300 establishes a separate and distinct communication connection between the user computer system and a live agent computer system (described previously with respect to FIG. 1), such that the user may obtain an appropriate query response from the live agent.

In some embodiments, the process 300 uses an application programming interface (API) to establish the second communication connection, by the at least one processor, wherein the API comprises at least one of a text API, an audio call API, a video call API, and a live agent text chat API. The API used by the process 300 to establish the second communication connection may facilitate any type of communication, and the format of the chat session between the end user computer and the live agent computer is determined by the type of API used. Exemplary embodiments of the API may include, without limitation, a Salesforce Live Agent API, Salesforce Snap-ins API, and/or a Salesforce Live Text API.

Once the second communication connection is established (step 312), the process 300 monitors the chat session that occurs using the second communication connection, and evaluates the chat between the user interface and the live agent interface, the chat transmitted via the second communication connection (step 314). The process 300 then identifies an answer to the user input query, based on evaluating the chat (step 316). Here, the process 300 identifies contents of the chat, wherein the contents comprise the user input query and a response provided by the live agent interface. The process 300 recognizes the response provided by the live agent as the answer. In certain embodiments, the process 300 records the interactions between human agent and the user, including the contents of the chat. The contents of the chat are then used by the process 300 to analyze a general pattern of conversation associated with the contents of the chat. The general pattern of conversation is then used by the process 300 in future to handle user query without resorting to the handoff to a human agent, if the confidence level exceeds the threshold.

After identifying the answer (step 316), the process 300 stores the answer to be provided by the AI entity during future chat instances of receiving the user input query (step 318). The process 300 associates the response to the user input query, to generate an associated response, and stores the user input query and the associated response in the database of query responses. Once stored, the new query response will be provided by the process 300 when the user input query is submitted by any chat user in the future.

Figure 4:
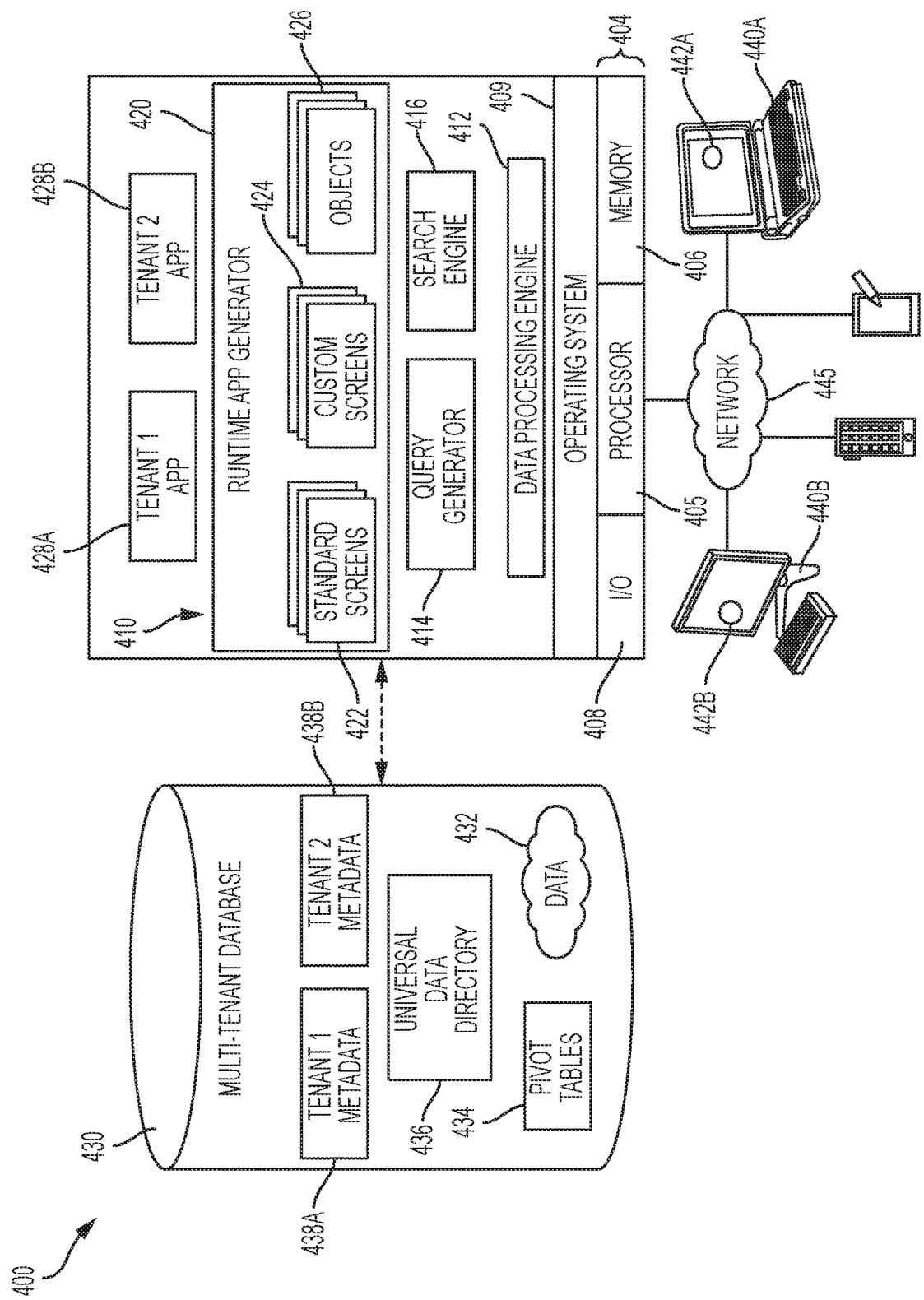
FIG. 4 is a conceptual block diagram of a multi-tenant system in accordance with one embodiment.

FIG. 4 is a conceptual block diagram of a multi-tenant system 400 in accordance with the disclosed embodiments. Some embodiments disclosed herein may include artificial intelligence (AI) entities, wherein each of the AI entities is associated with a particular tenant of the multi-tenant system 400. Additionally, some of the embodiments of AI entities disclosed herein may receive software updates or upgrades automatically when the multi-tenant system 400 is updated.

The multi-tenant system 400 may be used to in conjunction with the CRM software applications described previously. Platform as a Service (PaaS) is the foundation of the multi-tenant architecture. At the heart, this PaaS is a relational database management system. All of the core mechanisms in a relational database management system (RDBMS) (e.g., a system catalog, caching mechanisms, query optimizer, and application development features) are built to support multi-tenant applications and to be run directly on top of a specifically tuned host operating system and raw hardware. The runtime engine has the intelligence to access the metadata and transactional data and perform the application functionality that can scale.

The multi-tenant system 400 of FIG. 4 includes a server 402 that dynamically creates and supports virtual applications 428 based upon data 432 from a common database 430 that is shared between multiple tenants, alternatively referred to herein as a multi-tenant database. Data and services generated by the virtual applications 428 are provided via a network 445 to any number of client devices 440, as desired. Each virtual application 428 is suitably generated at run-time (or on-demand) using a common application platform 410 that securely provides access to the data 432 in the database 430 for each of the various tenants subscribing to the multi-tenant system 400. In accordance with one non-limiting example, the multi-tenant system 400 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 430. In this regard, each tenant includes one or more users associated with, assigned to, or otherwise belonging to that respective tenant. To put it another way, each respective user within the multi-tenant system 400 is associated with, assigned to, or otherwise belongs to a particular tenant of the plurality of tenants supported by the multi-tenant system 400. Tenants may represent customers, customer departments, business or legal organizations, and/or any other entities that maintain data for particular sets of users within the multi-tenant system 400 (i.e., in the multi-tenant database 430). For example, the application server 402 may be associated with one or more tenants supported by the multi-tenant system 400. Although multiple tenants may share access to the server 402 and the database 430, the particular data and services provided from the server 402 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 432 belonging to or otherwise associated with other tenants.

The multi-tenant database 430 is any sort of repository or other data storage system capable of storing and managing the data 432 associated with any number of tenants. The database 430 may be implemented using any type of conventional database server hardware. In various embodiments, the database 430 shares processing hardware 404 with the server 402. In other embodiments, the database 430 is implemented using separate physical and/or virtual database server hardware that communicates with the server 402 to perform the various functions described herein. In an exemplary embodiment, the database 430 includes a database management system or other equivalent software capable of determining an optimal query plan for retrieving and providing a particular subset of the data 432 to an instance of virtual application 428 in response to a query initiated or otherwise provided by a virtual application 428. The multi-tenant database 430 may alternatively be referred to herein as an on-demand database, in that the multi-tenant database 430 provides (or is available to provide) data at run-time to on-demand virtual applications 428 generated by the application platform 410.

In practice, the data 432 may be organized and formatted in any manner to support the application platform 410. In various embodiments, the data 432 is suitably organized into a relatively small number of large data tables to maintain a semi-amorphous "heap"-type format. The data 432 can then be organized as needed for a particular virtual application 428. In various embodiments, conventional data relationships are established using any number of pivot tables 434 that establish indexing, uniqueness, relationships between entities, and/or other aspects of conventional database organization as desired. Further data manipulation and report formatting is generally performed at run-time using a variety of metadata constructs. Metadata within a universal data directory (UDD) 436, for example, can be used to describe any number of forms, reports, workflows, user access privileges, business logic and other constructs that are common to multiple tenants. Tenant-specific formatting, functions and other constructs may be maintained as tenant-specific metadata 438 for each tenant, as desired. Rather than forcing the data 432 into an inflexible global structure that is common to all tenants and applications, the database 430 is organized to be relatively amorphous, with the pivot tables 434 and the metadata 438 providing additional structure on an as-needed basis. To that end, the application platform 410 suitably uses the pivot tables 434 and/or the metadata 438 to generate "virtual" components of the virtual applications 428 to logically obtain, process, and present the relatively amorphous data 432 from the database 430.

The server 402 is implemented using one or more actual and/or virtual computing systems that collectively provide the dynamic application platform 410 for generating the virtual applications 428. For example, the server 402 may be implemented using a cluster of actual and/or virtual servers operating in conjunction with each other, typically in association with conventional network communications, cluster management, load balancing and other features as appropriate. The server 402 operates with any sort of conventional processing hardware 404, such as a processor 405, memory 406, input/output features 408 and the like. The input/output features 408 generally represent the interface(s) to networks (e.g., to the network 445, or any other local area, wide area or other network), mass storage, display devices, data entry devices and/or the like. The processor 405 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 406 represents any non-transitory short or long term storage or other computer-readable media capable of storing programming instructions for execution on the processor 405, including any sort of random access memory (RAM), read only memory (ROM), flash memory, magnetic or optical mass storage, and/or the like. The computer-executable programming instructions, when read and executed by the server 402 and/or processor 405, cause the server 402 and/or processor 405 to create, generate, or otherwise facilitate the application platform 410 and/or virtual applications 428 and perform one or more additional tasks, operations, functions, and/or processes described herein. It should be noted that the memory 406 represents one suitable implementation of such computer-readable media, and alternatively or additionally, the server 402 could receive and cooperate with external computer-readable media that is realized as a portable or mobile component or application platform, e.g., a portable hard drive, a USB flash drive, an optical disc, or the like.

The application platform 410 is any sort of software application or other data processing engine that generates the virtual applications 428 that provide data and/or services to the client devices 440. In a typical embodiment, the application platform 410 gains access to processing resources, communications interfaces and other features of the processing hardware 404 using any sort of conventional or proprietary operating system 409. The virtual applications 428 are typically generated at run-time in response to input received from the client devices 440. For the illustrated embodiment, the application platform 410 includes a bulk data processing engine 412, a query generator 414, a search engine 416 that provides text indexing and other search functionality, and a runtime application generator 420. Each of these features may be implemented as a separate process or other module, and many equivalent embodiments could include different and/or additional features, components or other modules as desired.

The runtime application generator 420 dynamically builds and executes the virtual applications 428 in response to specific requests received from the client devices 440. The virtual applications 428 are typically constructed in accordance with the tenant-specific metadata 438, which describes the particular tables, reports, interfaces and/or other features of the particular application 428. In various embodiments, each virtual application 428 generates dynamic web content that can be served to a browser or other client program 442 associated with its client device 440, as appropriate.

The runtime application generator 420 suitably interacts with the query generator 414 to efficiently obtain multi-tenant data 432 from the database 430 as needed in response to input queries initiated or otherwise provided by users of the client devices 440. In a typical embodiment, the query generator 414 considers the identity of the user requesting a particular function (along with the user's associated tenant), and then builds and executes queries to the database 430 using system-wide metadata 436, tenant specific metadata 438, pivot tables 434, and/or any other available resources. The query generator 414 in this example therefore maintains security of the common database 430 by ensuring that queries are consistent with access privileges granted to the user and/or tenant that initiated the request. In this manner, the query generator 414 suitably obtains requested subsets of data 432 accessible to a user and/or tenant from the database 430 as needed to populate the tables, reports or other features of the particular virtual application 428 for that user and/or tenant.

Still referring to FIG. 4, the data processing engine 412 performs bulk processing operations on the data 432 such as uploads or downloads, updates, online transaction processing, and/or the like. In many embodiments, less urgent bulk processing of the data 432 can be scheduled to occur as processing resources become available, thereby giving priority to more urgent data processing by the query generator 414, the search engine 416, the virtual applications 428, etc.

In exemplary embodiments, the application platform 410 is utilized to create and/or generate data-driven virtual applications 428 for the tenants that they support. Such virtual applications 428 may make use of interface features such as custom (or tenant-specific) screens 424, standard (or universal) screens 422 or the like. Any number of custom and/or standard objects 426 may also be available for integration into tenant-developed virtual applications 428. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 426 such as "account" objects, "opportunity" objects, "contact" objects, or the like. The data 432 associated with each virtual application 428 is provided to the database 430, as appropriate, and stored until it is requested or is otherwise needed, along with the metadata 438 that describes the particular features (e.g., reports, tables, functions, objects, fields, formulas, code, etc.) of that particular virtual application 428. For example, a virtual application 428 may include a number of objects 426 accessible to a tenant, wherein for each object 426 accessible to the tenant, information pertaining to its object type along with values for various fields associated with that respective object type are maintained as metadata 438 in the database 430. In this regard, the object type defines the structure (e.g., the formatting, functions and other constructs) of each respective object 426 and the various fields associated therewith.

Still referring to FIG. 4, the data and services provided by the server 402 can be retrieved using any sort of personal computer, mobile telephone, tablet or other network-enabled client device 440 on the network 445. In an exemplary embodiment, the client device 440 includes a display device, such as a monitor, screen, or another conventional electronic display capable of graphically presenting data and/or information retrieved from the multi-tenant database 430. Typically, the user operates a conventional browser application or other client program 442 executed by the client device 440 to contact the server 402 via the network 445 using a networking protocol, such as the hypertext transport protocol (HTTP) or the like. The user typically authenticates his or her identity to the server 402 to obtain a session identifier ("SessionID") that identifies the user in subsequent communications with the server 402. When the identified user requests access to a virtual application 428, the runtime application generator 420 suitably creates the application at run time based upon the metadata 438, as appropriate. As noted above, the virtual application 428 may contain Java, ActiveX, or other content that can be presented using conventional client software running on the client device 440; other embodiments may simply provide dynamic web or other content that can be presented and viewed by the user, as desired.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIG. 2 depicts one exemplary arrangement of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for providing query responses to a user, the method comprising:
   receiving, by an artificial intelligence (AI) entity comprising at least one processor and a memory element configured to store a database of a plurality of query answers, a user input query transmitted over a network via a first communication connection between a user interface and the AI entity;
   determining at least one of an intent and a sentiment of the user based on the user input query;
   determining whether the at least one of the intent and the sentiment of the user matches one of a plurality of candidate user input queries within a confidence threshold;
   when the at least one of the intent and the sentiment of the user does not match one of the plurality of candidate user input queries within the confidence threshold, establishing a separate communication connection between the user interface and a live agent interface over the network;
   evaluating content of a chat session between the user interface and the live agent interface using the separate communication connection to identify a response provided by the live agent interface as an answer to the user input query; and
   storing, by the AI entity, the answer associated with the user input query in the database of the plurality of query answers.

2. The method of claim 1, wherein the first communication connection is established by connecting to an instant messaging platform using a computer network;
   wherein the user interface comprises a graphical user interface (GUI) presented by the instant messaging platform; and
   wherein the user input query is received via the GUI and transmitted by the instant messaging platform.

3. The method of claim 1, wherein the first communication connection is established by connecting to a social media instant messaging platform using a computer network;
   wherein the user interface comprises a social media chat interface presented by the social media instant messaging platform; and
   wherein the user input query is received via the social media chat interface and transmitted by the social media instant messaging platform.

4. The method of claim 1, further comprising:
   performing a lookup to locate a match for the user input query in the plurality of query answers; and
   when there is no match for the user input query in the plurality of query answers, determining that the AI entity is unable to locate a predefined query answer corresponding to the user input query.

5. The method of claim 1, wherein evaluating the content of the chat session further comprises:
   identifying contents of the chat session, wherein the contents comprise the user input query and the response provided by the live agent interface, wherein the answer comprises the response; and
   wherein storing the answer further comprises:
   associating the response to the user input query, to generate an associated response; and
   storing the user input query and the associated response.

6. The method of claim 5, wherein the response comprises a text-based message, a voice-based message, or a video-based message from a live agent computer system.

7. The method of claim 1, wherein establishing the separate communication connection comprises the AI entity using an application programming interface (API) to establish a second communication connection between a live agent computer system and a user computer system over the network.

8. The method of claim 7, wherein the second communication connection is separate and distinct from the first communication connection between the user computer system and the AI entity over the network.

9. The method of claim 7, wherein the API comprises at least one of a text API, an audio call API, a video call API, and a live agent text chat API.

10. The method of claim 1, wherein evaluating the content of the chat session comprises performing machine learning to analyze a general pattern of conversation associated with the content of the chat session and identify the response provided by the live agent interface as the answer.

11. The method of claim 1, further comprising, after storing the answer associated with the user input query in the database of the plurality of query answers, providing, by the AI entity, the answer associated with the user input query in the database of the plurality of query answers in response to another instance of receiving the user input query.

12. The method of claim 1, wherein:
   the plurality of query answers comprise a plurality of responses for user queries;

each of the plurality of responses is associated with one or more of the plurality of candidate user input queries; and the AI entity is unable to locate a predefined query answer of the plurality of query answers corresponding to the user input query when the at least one of the intent and the sentiment of the user does not match one of the plurality of candidate user input queries within the confidence threshold.

13. A system comprising:
a system memory element configured to store a plurality of query answers;
a communication device, configured to establish communication connections using a computer network; and
at least one processor communicatively coupled to the system memory element and the communication device, the at least one processor configured to:
  establish a first communication connection, via the communication device, between a user interface and an artificial intelligence (AI) entity;
  receive a user input query transmitted via the first communication connection and from the user interface;
  determine at least one of an intent and a sentiment of a user based on the user input query;
  perform a lookup in the plurality of query answers to locate a query answer corresponding to the user input query when at least one of the intent and the sentiment of the user matches one of a plurality of candidate user input queries within a confidence threshold;
  when the plurality of query answers does not include a predefined query answer corresponding to the user input query when the at least one of the intent and the sentiment of the user does not match one of the plurality of candidate user input queries within the confidence threshold, establish a separate communication connection between the user interface and a live agent interface;
  evaluate content of a chat session between the user interface and the live agent interface using the separate communication connection to identify a response provided by the live agent interface as an answer to the user input query; and
  store the answer in association with the user input query in the plurality of query answers in the system memory element.

14. The system of claim 13, wherein the at least one processor is further configured to locate the query answer, by:
  performing the lookup to locate a match for the user input query in the plurality of query answers; and
  when there is no match for the user input query in the plurality of query answers, determining that the at least one processor is unable to locate the query answer corresponding to the user input query.

15. The system of claim 13, wherein the at least one processor is further configured to evaluate the content of the chat session, by:
  identifying contents of the chat session, wherein the contents comprise the user input query and the response provided by the live agent interface; and wherein storing the answer further comprises:
  associating the response to the user input query, to generate an associated response; and
  storing the user input query and the associated response in the plurality of query answers.

16. The system of claim 13, wherein the at least one processor is further configured to use an application programming interface (API) to establish the separate communication connection between a live agent computer system and a user computer system over a network, wherein the separate communication connection is distinct from the first communication connection between the user computer system and the AI entity over the network.

17. A non-transitory, computer-readable medium containing instructions thereon, which, when executed by a processor, are capable of performing a method comprising:
  when the processor is unable to locate a predefined query answer in a database of predefined query answers corresponding to a user input query submitted to an artificial intelligence (AI) entity via a user interface of an instant messaging platform over a network via a first communication connection when at least one of an intent and a sentiment of a user based on the user input query does not match one of a plurality of candidate user input queries within a confidence threshold,
  establishing a separate communication connection between the user interface and a live agent interface over the network;
  evaluating contents of a chat session between the user interface and the live agent interface using the separate communication connection to identify a response provided by the live agent interface as an answer to the user input query;
  associating the response to the user input query, to generate an associated response; and
  storing the associated response comprising the answer in association with the user input query in the database of predefined query answers for future use.

18. The non-transitory, computer-readable medium of claim 17, wherein the method further comprises:
  performing a lookup, by the processor, in the predefined query answers, to locate a query answer corresponding to the user input query;
  wherein the separate communication connection is established when the predefined query answers do not include the query answer corresponding to the user input query.

19. The non-transitory, computer-readable medium of claim 18, wherein the first communication connection is established by connecting to the instant messaging platform using a computer network;
  wherein the user interface comprises a graphical user interface (GUI) presented by the instant messaging platform; and
  wherein the user input query is received via the GUI and transmitted by the instant messaging platform.

20. The non-transitory, computer-readable medium of claim 17, wherein the AI entity comprises a chat-bot.

* * * * *